UNITED STATES PATENT OFFICE.

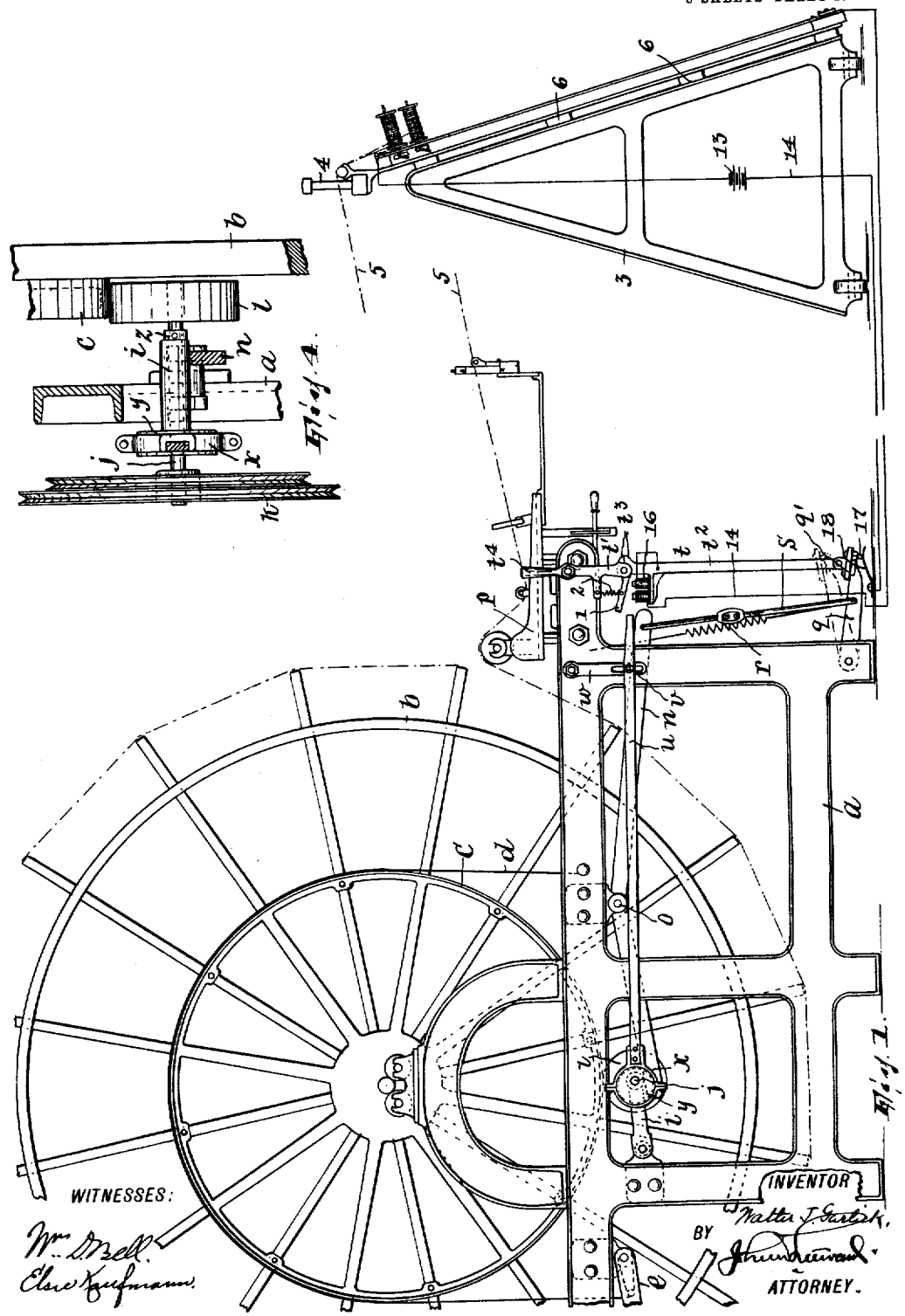

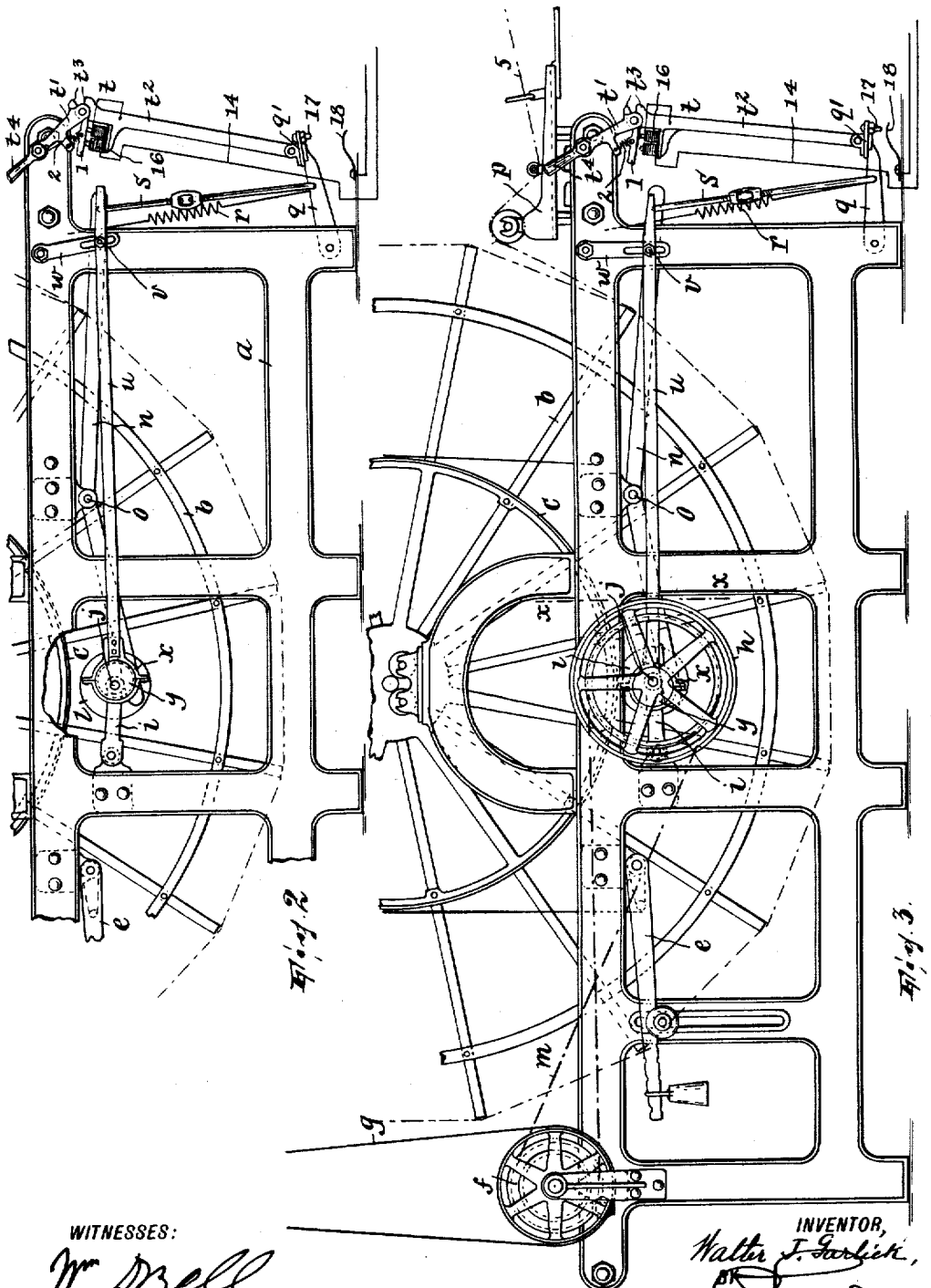

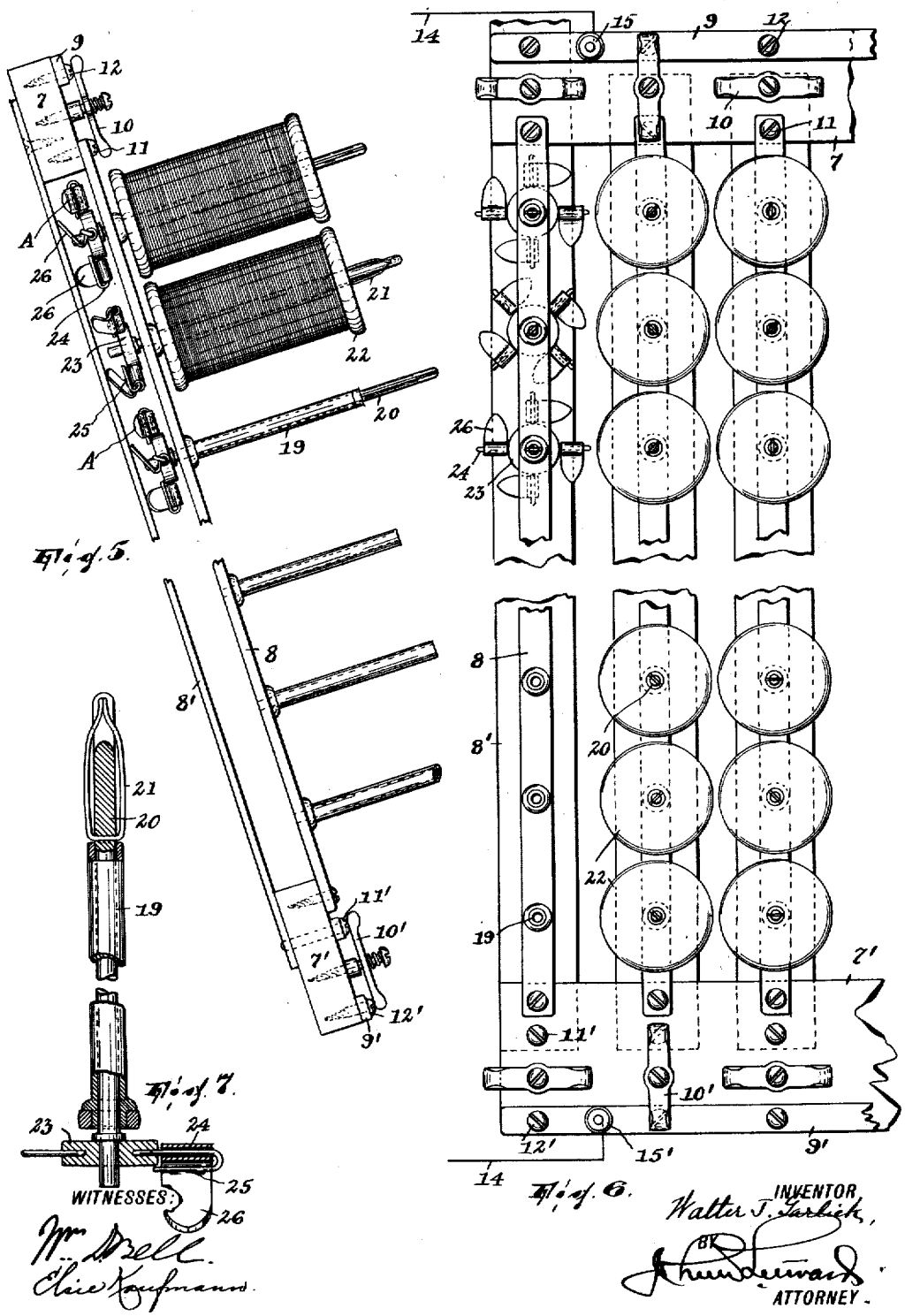

WALTER J. GARLICK, OF PATERSON, NEW JERSEY, ASSIGNOR TO NICHOLAS A. HOVER AND EMILE COENE, BOTH OF PATERSON, NEW JERSEY; MARY HOVER EXECUTRIX OF SAID NICHOLAS A. HOVER, DECEASED.

STOP-MOTION MECHANISM FOR WARPING-MACHINES.

1,023,730. Specification of Letters Patent. Patented Apr. 16, 1912.

Application filed October 10, 1910. Serial No. 586,131.

*To all whom it may concern:*

Be it known that I, WALTER J. GARLICK, a citizen of the United States, residing in Paterson, Passaic county, and State of New Jersey, have invented certain new and useful Improvements in Stop-Motion Mechanisms for Warping-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to warping machines and it consists in certain novel combinations and arrangement of parts and mechanisms hereinafter set forth in the clauses of the claim and described in detail in connection with the accompanying drawings with reference to the preferred form of the invention, whereby the movement of some moving part of the machine, as the rotary reel, is automatically controlled from the warp, for instance, to stop the rotation of the reel should one of the threads of the warp break.

In the accompanying drawings, in which the invention is fully illustrated, Figure 1 is a side elevation of a warping machine and its controlling mechanism constructed in accordance with this invention, the several parts occupying that relation to each other which is maintained when the reel is in motion; Fig. 2 is a substantially similar view of the warping machine and a portion of the controlling means, showing the parts in the position which they occupy when the reel is stationary; Fig. 3 is a view similar to Fig. 2 showing the parts in the position which they occupy to set the reel in motion and just prior to establishing the controlling means in operative condition; Fig. 4 is a sectional view on approximately the line $x$—$x$ in Fig. 3, and looking toward the left; Fig. 5 is a side elevation of a portion of the creel and two spools arranged thereon; Fig. 6 is a front elevation of what is seen in Fig. 5; and, Fig. 7 is a view of a detail contained in Figs. 5 and 6.

I have illustrated my invention in connection with a warping machine of a well known type in which $a$ is the frame; $b$ the reel having a circular flange $c$ around which extends a brake-band $d$ attached to the frame at one end and held taut by a weighted lever $e$ connected with its other end; $f$ a system of pulleys driven by a belt $g$; $h$ a transmission means (comprising Fig. 4, a pivoted arm $i$, a shaft $j$, journaled in said arm, a cone pulley $k$ and a friction wheel $l$ secured on the ends of said shaft, the cone-pulley being adapted to receive a crossed belt $m$ extending around one of the pulleys $f$, Fig. 1, and the friction wheel $l$ being engageable with the flange $c$ to drive the reel); a lever $n$ fulcrumed at $o$ and having one end underlying the arm $i$ and the other end projecting toward the right-hand end of the machine, whereby, according as the free or right-hand end of said lever is raised or lowered, the rotating friction wheel $l$ will be moved out of or into driving relation with the reel; and the usual reed carriage $p$.

The position of the lever $n$ is controlled in the present instance by a mechanism somewhat similar to that set forth in my prior Patent No. 685234. That is to say: $q$ is a treadle-lever which is normally pulled upwardly by a spring $r$ and which is connected with the right-hand end of the lever $n$ by a pitman $s$; this treadle-lever $q$ is pivotally connected with the frame $a$ by a toggle-lever $t$ the details of whose construction it is unnecessary to describe, in view of the full and clear illustration thereof afforded in the accompanying drawings, it being sufficient to state that when the parts $t'$ and $t^2$ are alined with each other, their respective stops $t^3$ then impinging against each other, the toggle lever holds lever $q$ down against the tension of the spring $r$, so that lever $n$ maintains the friction wheel $l$ in driving contact with the reel flange $c$, but should the toggle lever be buckled, as by a force applied at the left side thereof in the drawings, it will allow the spring $i$ to raise lever $q$, consequently moving lever $n$ so that the latter withdraws the friction wheel from driving contact with the reel flange $c$. Movement of the toggle lever into its straightened or extending condition may be accomplished either manually, at the handle $t^4$, or by foot pressure upon the treadle $q'$ of the treadle lever. In the present instance, the buckling of the toggle lever is accomplished by a dagger $u$ having a vertically adjustable pivot $v$ in a suitable bracket $w$ and also having an eccentric strap $x$ embracing an eccentric $y$ on the shaft $j$ (said eccentric and a collar $z$ on the shaft incidentally serving to confine the shaft against longitudinal movement in the arm $i$), said dagger constituting a going part which, when an arm 1 pivoted in the toggle lever, is moved into alinement with the dagger (that is, is operatively interposed between the free end of the dagger and the toggle lever) operates therethrough to exert the necessary buckling pressure on the toggle-lever, the said arm 1 being normally held elevated out of alinement with the dagger by a spiral spring 2 connecting the arm with the upper member $t'$ of the toggle-lever.

3 is the creel provided with the reed 4 through which the warp threads 5 extend on their way to the reeds of the carriage $p$ of the warping machine. The said creel comprises the horizontal rails 6 to which is suitably attached the mechanism shown in Figs. 5, 6 and 7. In this mechanism 7 and 7' designate two wooden or other insulating strips against the front and rear faces of which are secured the two sets of vertical parallel metallic bars 8 and 8'. A horizontal metallic bar 9 is secured to the strip 7 in spaced relation to the bars 8, and any one bar 8 may be electrically connected with the bar 9 by turning a metallic button 10 into bridging relation to the screws 11 and 12 which respectively secure said bars 8 and 9 to the strip 7. Similarly, another horizontal metallic bar 9' is secured to the front face of the strip 7', and any one bar 8' may be electrically connected with the bar 9' by turning a metallic button 10' into bridging relation to the screws 11' and 12' which respectively secure said bars 8' and 9' to the strip 7'.

It will be observed that when the buttons occupy the bridging or electrically connecting position with respect to the set of bars 9 and 8 and the set of bars 9' and 8', each set of bars forms a branched terminal for an electric circuit comprising a source of energy 13, a wire 14 including said energy source and having its ends connected with the bars 9 and 9' at the binding post 15 and 15', an electromagnet or magnets 16 carried by the part $t^2$ of the toggle lever, said part $t^2$, the treadle $q'$, a contact device 17 and a spring 18 which is arranged under the contact device 17, the parts 17 and 18 forming a break in the circuit when the treadle-lever is raised and closing the circuit when it is sufficiently depressed. (It will be understood that parts $t^2$, $q'$, 17 and 18 are made of conducting material). The magnets 16 are disposed directly under the arm 1, said arm therefore being the armature for the magnets.

In each bar 8 is fixed a sleeve 19 which forms a journal for a spindle 20 which protrudes at one end from the sleeve and at the other end through the bar 8. In its free or outer end is secured a spring clip 21 adapted to grip the bore of a spool 22 which is the source of supply for one of the warp threads 5, and on its other end is fixed a hub 23 from which project radially bearing devices 24 having their free ends rebent, as at 25, so as to retain thereon the pivoted circuit closers 26. It will be observed that the hub and the circuit closers are disposed between the bars 8 and 8' and that the incline of the spindle and the form of the circuit closers are such that when the spindle is stationary one or more of the circuit closers will be held by gravity against the bar 8'; when, however, the spindle is rotated the action of centrifugal force on the several circuit closers is to move them into the position in which two such circuit closers are shown at A in Fig. 5. If any one circuit closer engages the bar 8' the circuit will be closed between said bar and the corresponding bar 8.

Operation: Assuming that the machine is ready to be started, either by shifting the handle $t^4$ or pressing upon the treadle $q'$ the operator causes the rotating friction wheel $l$ to come in contact with the reel flange $c$. As usual, this movement is accomplished slowly, so that the reel is started rotating gradually and undue strain upon the warp threads is avoided. Prior to starting the machine the circuit was of course closed as between two bars 8 and 8' on the creel 3, but as soon as the reel is put in motion the several spools begin to rotate and centrifugal force causes the several devices 26 to separate from the bar 8', so that the circuit is now open between 8 and 8', provided, of course, no thread is broken and all the spools are therefore rotating. When the contact 17 moves downwardly toward spring 18, it does not engage the same until the reel is rotating at sufficient speed so that centrifugal force operating upon the devices 26 will be sufficient to clear them from contact with bars 8' (otherwise the energizing of the magnets would cause the stopping of the machine at once); in other words the closing of the circuit between 17 and 18 is deferred until after the centrifugal force acting on the device 26 is sufficient to clear them all from contact with the bars 8'. If, now, any warp thread breaks (or were one already broken such condition being unnoticed upon starting) the circuit will be closed between one of the bars 8 and the corresponding bar 8' (because the spool corresponding to the broken warp thread ceases or is not rotating and hence one or more of its devices 26 is contacting with the bar 8'), the magnets will be energized, the arm 1 drawn downwardly into alinement with the dagger

*u*, and on the next movement of the dagger toward the arm it will engage the latter and buckle the toggle lever, whereby friction wheel *l* will be moved out of driving contact with the wheel flange *c* and the brake-band *d* act to stop the rotation of the reel.

The purpose of providing the buttons 10 is to permit throwing one or more pairs of bars 8 or 8′ in or out of circuit according as the corresponding vertical row or rows of spindles is or is not in commission.

Having thus fully described my invention, what I claim as new and desire to secure by Letters Patent is:

1. The combination of a supporting means, rotary members from around the axis of one of which the thread is to be unwound and around the axis of the other of which the thread is to be wound, and electro-magnetic means for controlling the movement of one of said members comprising an electric circuit having a break therein, one of said members having an electro-conductive portion movable therewith to electrically bridge said break, substantially as described.

2. The combination of a supporting means, rotary members from around the axis of one of which the thread is to be unwound and around the axis of the other of which the thread is to be wound, and electro-magnetic means for controlling the movements of one of said members comprising an electric circuit having a break therein, one of said members having an electro-conductive centrifugally actuated portion movable therein to close said break, substantially as described.

3. In combination, with a warping machine comprising a rotary reel to be driven, electro-magnetic means for controlling the movement of said reel comprising an electric circuit having a break therein, a support, and a rotary spool-carrying electro-conductive member journaled in the support and electrically connected with one terminal of the circuit at said break, said member comprising a movable part engageable with the other terminal at said break, substantially as described.

4. In combination, with a warping machine comprising a rotary reel to be driven, electro-magnetic means for controlling the movement of said reel comprising an electric circuit having a break therein, a support, and a rotary spool-carrying electro-conductive member journaled in the support and electrically connected with one terminal of the circuit at said break, said member comprising a centrifugally actuated movable part engageable with the other terminal at said break, substantially as described.

5. In combination, with a warping machine including a reel member and its driving member movable one into engagement with the other, an electro-magnetic warp-controlled controlling mechanism for the movable member comprising an electric circuit and means, operatively connected with the movable member, for moving the latter, said means being movable in one direction first to effect movement of the movable member into engagement with the other member and then to close said circuit, substantially as described.

In testimony, that I claim the foregoing I have hereunto set my hand this 8th day of October, 1910.

WALTER J. GARLICK.

Witnesses:
JOHN W. STEWARD,
WM. D. BELL.

---

Copies of this patent may be obtained for five cents each, by addressing the "Commissioner of Patents. Washington, D. C."